F. W. PETERS.
UNIVERSAL JOINT.
APPLICATION FILED JUNE 5, 1918.
1,304,901. Patented May 27, 1919.
Fig. 1.
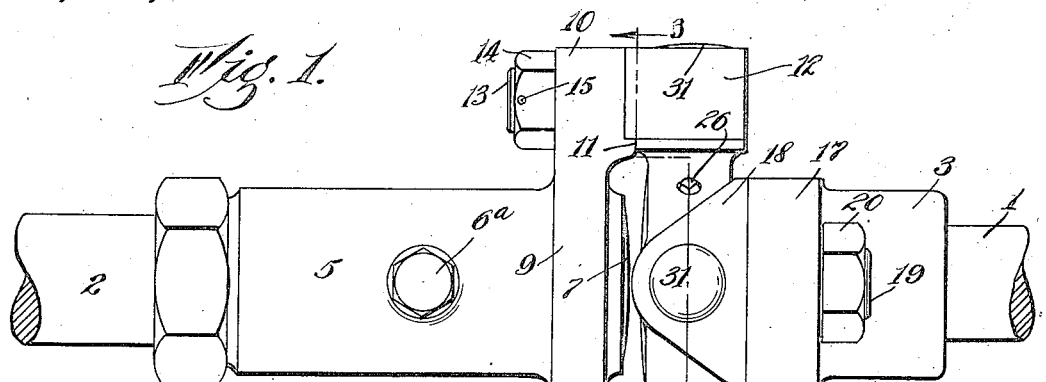
Fig. 2.
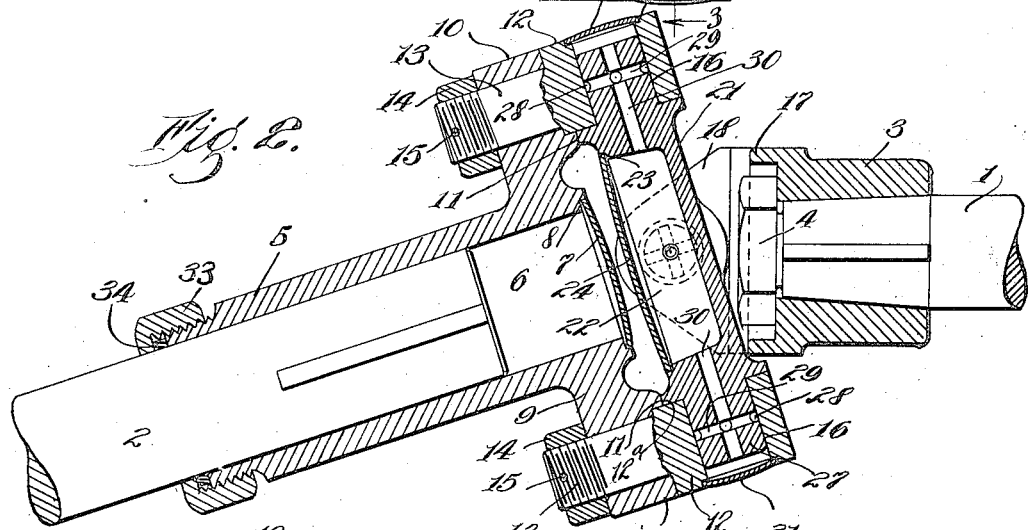
Fig. 3.
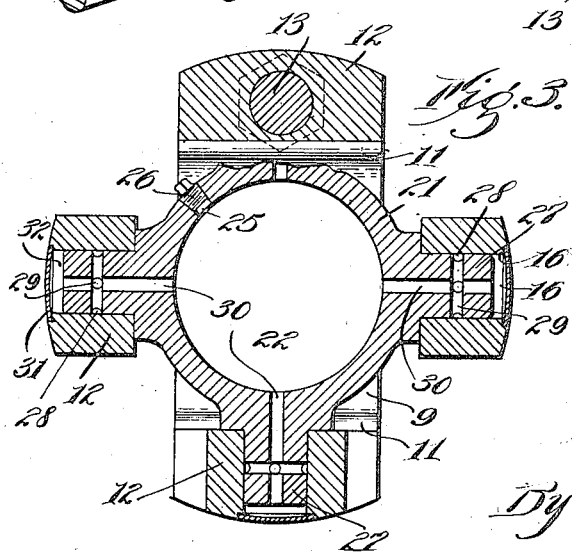
Fig. 4.
Inventor,
Frederick W. Peters.
By Hull, Smith, Buck West,
Attys.

UNITED STATES PATENT OFFICE.

FREDERICK W. PETERS, OF WEST PARK, OHIO, ASSIGNOR TO THE PETERS MACHINE AND MANUFACTURING COMPANY, OF CLEVELAND, OHIO, A CORPORATION OF OHIO.

UNIVERSAL JOINT.

1,304,901.		Specification of Letters Patent.		Patented May 27, 1919.

Application filed June 5, 1918. Serial No. 238,240.

*To all whom it may concern:*

Be it known that I, FREDERICK W. PETERS, a citizen of the United States, residing at West Park, in the county of Cuyahoga and State of Ohio, have invented a certain new and useful Improvement in Universal Joints, of which the following is a full, clear, and exact description, reference being had to the accompanying drawings.

This invention relates to universal joints, and has for its general objects to produce a joint which will insure a maximum lubricating efficiency; which, in operation, will produce a true circular movement between the members thereof; and which will secure the foregoing results in a joint wherein simplicity of construction and cheapness of production are conjoined. I realize the foregoing general objects, and other more limited objects which will appear hereinafter, in and through the embodiment of my invention illustrated in the drawings forming a part hereof, wherein Figure 1 represents a side elevation of such joint, with its coöperating parts; Fig. 2 a central longitudinal section through such joint and parts, certain of the parts being shown in elevation; Fig. 3 a transverse sectional view corresponding to the line 3—3 of Fig. 1, some of the parts being broken away; and Fig. 4 a sectional view through a modification of the central or cross member shown in the preceding views.

Describing by reference characters the various parts illustrated herein, 1 and 2 denote the end portions of shaft members connected by my joint. The shaft member 1 is provided with a hub 3 which may be splined thereto, the hub being shown as provided with a tapered bore for the reception of the correspondingly tapered portion of the shaft end. At its extreme end, the shaft member is reduced and threaded for the reception of a nut 4 by means of which and the spline it is connected to the hub. The shaft member 2 is also splined to an elongated hub 5 which is shown as extending beyond the end of the shaft and providing therefor a lubricant well 6 having a filling opening closed by a removable plug 6ª and closed at its outer end by means of a concavo-convex plate 7 forced to a seat 8 by springing the central portion of the plate inwardly, said plate being preferably what is known to the trade as a "Welch plug". Extending transversely of the inner end of the hub is a supporting base or flange 9 having at each end thereof a flanged projection 10 which is faced off and machined to provide an accurate seat for the base of a bearing block, being provided with a shoulder 11 which is adapted to bear against and aline the adjacent side 12ª of the bearing block 12 with reference to a trunnion of the cross member. Each block is provided with a stud 13 projecting from the base thereof through a bore in the outer end of the base flange 9, the stud making a snug fit with said bore and being threaded to receive a nut 14. The nuts are preferably castellated, whereby they may be locked in place, as by means of cotter pins 15. Each block 12 is provided with a bore 16 constituting a bearing for one of the trunnions of the cross member, which will be described hereinafter.

The hub 3 is provided with a base 17 similar to the base 9 and having seats for blocks 18 similar in construction and arrangement to the corresponding parts carried by the hub 5. The stud of one of said blocks is indicated at 19 and the clamp nut for said stud at 20.

21 denotes generally the rotatable cross member carrying the trunnions and connecting the two shaft ends through the bearing blocks. This cross member consists of a central cylindrical portion having a cup 22 formed therein, the outer end of said cup being provided with a machined seat 23 for the reception of a concavo-convex plate 24 of the "Welch plug" type and adapted to be secured in place by forcing the central portion of the plate inwardly or toward the bottom of the cup, thus springing the plate in place. The cup and closure 24 constitute a centrally located lubricating well to which the lubricant may be conveniently supplied from time to time by means of an opening 25 having a removable plug 26 therein.

Projecting from the cross member are the trunnions 27. Each trunnion is shown as shorter than the bore 16 provided therefor in its bearing block and is provided with a lubricant distributing groove 28 extending therearound and communicating by a cross port 29 with a radial port 30, the inner end whereof communicates with the well or cup 22. The outer end of each bore 16 is provided with a machined seat 16ª for the reception of a cover plate 31, which may also be of the "Welch plug" type and providing beyond the end of each trunnion a well 32 for lubricant which may be conducted thereto from the central cup or well 22 through the radial port 30.

In order to prevent unnecessary loss of lubricant from the well 6, the end of the hub 5 remote from such well is shown as provided with a shouldered nut 33, with a packing ring 34 interposed between the shoulder of such nut and the hub end.

In assembling, the cross member 21 may be connected to one of the supporting bases or flanges by means of the bearing blocks, studs and nuts, after which the other two blocks may be slipped over their corresponding trunnions, their studs inserted into the appropriate bores provided therefor in the base or flange on the opposite hub and the nuts set up, the shoulders, shown at 11, provided at the inner ends of their seats serving to properly aline the blocks with reference to the trunnions and prevent rotation of the blocks.

The trunnions and the studs are hardened and ground, rendering the employment of bushings unnecessary.

In Fig. 4 there is shown a modification of the central cross member wherein the lubricant well 35 is provided between a pair of plates 36, the peripheries whereof are fitted in seats 37, the plates being secured together at their central portions, as by means of a spacing rivet 38; or the plates may be secured to their seats as by torch welding.

The construction of the cross member insures maximum lubricating efficiency, since the lubricant within the well 22 will be thrown out by centrifugal action through the ports 30 and 29 into the wells 32 and back up therefrom into the grooves 28 and thence into the bearings surrounding the trunnions.

Having thus described my invention what I claim is:—

1. In a device of the character described, the combination of a rotatable member having trunnions projecting therefrom and a well having a recessed annular seat at the one end thereof, a cover coöperating with and sprung into said seat, bearings for said trunnions, means for conducting through centrifugal action lubricant from the said well to the said bearings, and a filling connection communicating with said well.

2. In a universal joint, the combination of a pair of shaft members each having a supporting flange or base provided at opposite ends thereof with a seat having an aperture therethrough, a bearing block for each seat having a stud adapted to extend through the aperture thereof, a nut for each stud, a cross member having trunnions rotatably supported in said blocks, and coöperating means between each block and its seat for preventing the rotation of the blocks on their respective seats.

3. In a universal joint, the combination of a supporting flange or base provided at opposite ends thereof with a seat having an aperture therethrough, a bearing block for each seat and having a stud adapted to extend through the aperture thereof and a nut for each stud, said seats each having a projection coöperating with its block to prevent rotation thereof.

4. In a universal joint, the combination of a pair of rotatable shaft members each having a supporting base provided at each end thereof with a seat and a shoulder at one side of each seat and having an aperture extending through said seat, a bearing block for each seat, each block being provided with a stud adapted to project through the bore of its seat and with a side coöperating with the shoulder of such seat, nuts for said studs, and a cross member having trunnions journaled in said blocks.

5. In a universal joint, the combination of a pair of rotatable shaft sections, a supporting base carried by each shaft section and having a pair of diametrically opposed seats, a shoulder alongside each seat, and a bore extending through each seat, bearing blocks coöperating with said seats and each having a wall coöperating with a shoulder of a seat and a stud adapted to extend through the bore of such seat, and a cross member having trunnions journaled in said blocks.

6. In a universal joint, the combination of a pair of shaft members, blocks detachably connected to each of said members and each having a bearing bore closed at its outer end, and a cross member having a central lubricant well and trunnions projecting therefrom and mounted in and terminating within the outer ends of said bearing bores, thereby to provide lubricant wells within such bores beyond the outer ends of said trunnions, there being a port in each trunnion communicating with the central lubricant well and with a well provided at the outer end of one of the bearing bores.

7. In a universal joint, the combination of a pair of shaft members, blocks carried by each of said members and each having a bore extending outwardly from the inner side and terminating within the outer surface of the body thereof, and a cross member having a central lubricant well and trunnions projecting therefrom and mounted in and terminating within the outer ends of said bearing bores, thereby to provide lubricant wells within such bores beyond the outer ends of said trunnions, there being a port in each trunnion, communicating with the central lubricant well and with a well provided at the outer end of one of the bearing bores.

8. In a universal joint, the combination of a pair of shaft members, blocks carried by each of said members and each having a bore extending from the inner to the outer side thereof and provided with an annular seat surrounding its outer end, a cover plate coöperating with and sprung into each seat, and a cross member having a central lubricant well and trunnions projecting therefrom and mounted in and terminating within the outer ends of said bearing bores, thereby to provide lubricant wells within such bores beyond the outer ends of said trunnions, there being a port in each trunnion communicating with the central lubricant well and with a well provided at the outer end of one of the bearing bores.

9. In a universal joint, the combination of a pair of shaft members each having a supporting flange or base provided at opposite ends thereof with a seat having an aperture therethrough, a bearing block for each seat and having a stud adapted to extend through the aperture thereof, means coöperating with the portion of each stud projecting beyond an aperture and with the flange or base for drawing each block to its seat, and coöperating means between each block and its seat for preventing the rotation of the blocks on their respective seats.

In testimony whereof, I hereunto affix my signature.

FREDERICK W. PETERS.